Figure 1:
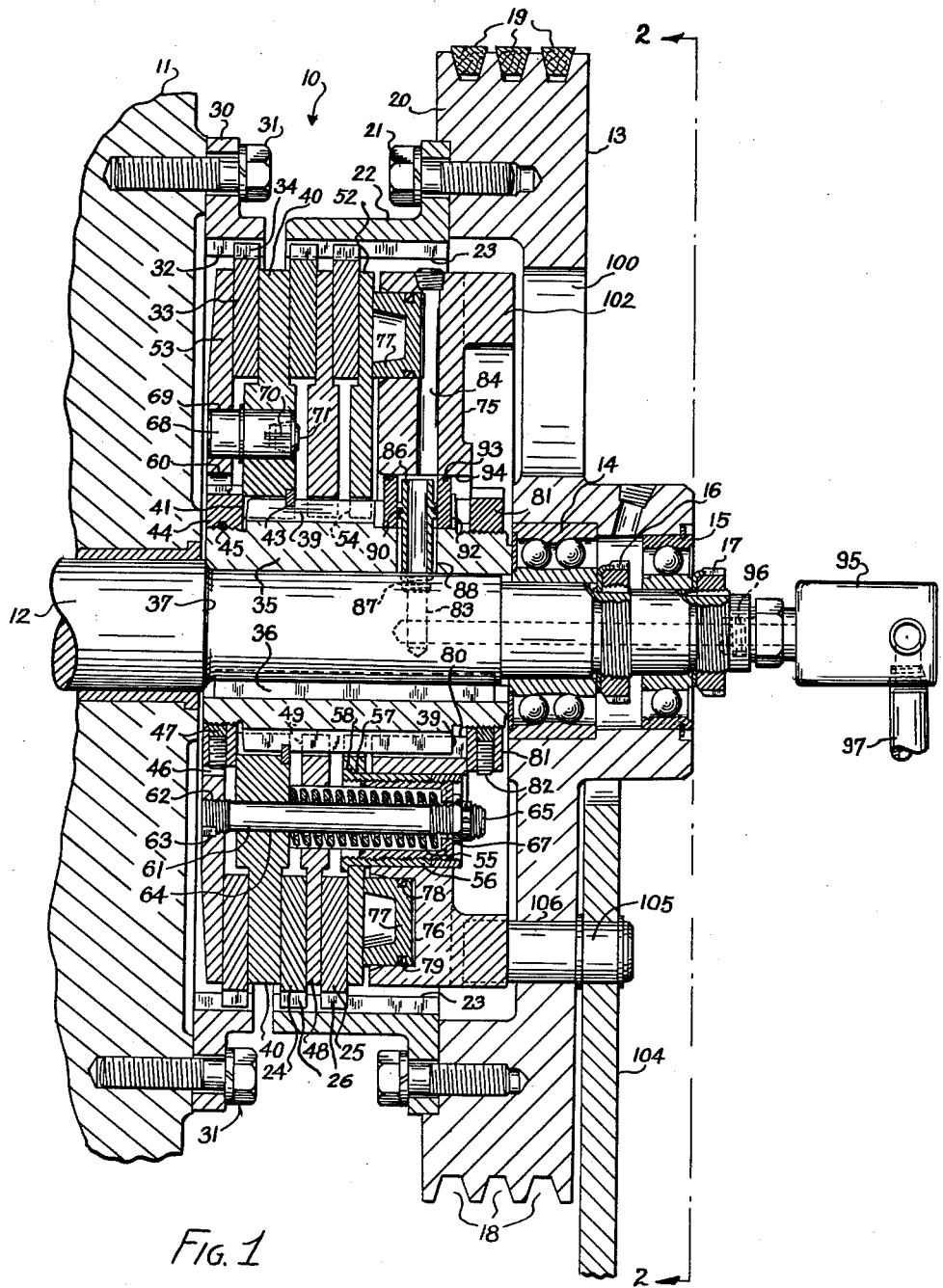

Feb. 12, 1963

R. B. TREER 3,077,252

CLUTCH-BRAKE UNIT

Filed Oct. 22, 1959

2 Sheets-Sheet 1

INVENTOR.
Ross B. Treer
BY Hudson, Boughton,
Williams, David & Hoffman
ATTORNEYS

INVENTOR.
ROSS B. TREER

United States Patent Office 3,077,252
Patented Feb. 12, 1963

3,077,252
CLUTCH-BRAKE UNIT
Ross B. Treer, Lakewood, Ohio, assignor to Alexander C. Smith, Warrensville Heights, Ohio
Filed Oct. 22, 1959, Ser. No. 848,149
4 Claims. (Cl. 192—18)

This invention relates to a combination clutch and brake mechanism and more particularly to such a mechanism having friction clutch and braek elements which are selectively engageable either to rotate a supporting shaft, such as the drive shaft of presses or the like, or to halt the rotation thereof.

It is an object of the invention to provide a novel combination clutch and brake of the fluid pressure actuated type which is rugged and simple of construction, and provides sure and reliable operation under severe conditions of use, and which nevertheless has a relatively narrow profile particularly adapting it to use on a shaft between a power driven sheave or flywheel and the stationary portion of a press or the like, whereby when used on an overhanging shaft supporting a flywheel, objectionable overhang of the shaft may be avoided.

As another object, this invention provides a compact clutch and brake assembly for intermittently rotating and stopping a shaft of a machine such as a press or the like having a constantly rotating flywheel on the shaft, wherein a clutch member is mounted on the flywheel and a brake member is mounted on the machine, such members being axially shiftable to engage with a common plate or element fixed therebetween on the shaft, and wherein the clutch and brake members and the fixed common member are disposed between pressure elements being resiliently urged in one direction by biasing means, such that shifting of one of the pressure elements by an actuating means against the influence of the biasing means will prevent the latter from being effective on the other of the pressure elements.

The invention has as a further object the provision of a new and improved clutch and brake mechanism for the operation of power presses or other machines using flywheel and intermittently rotated shaft arrangements, the mechanism having clutch and brake elements non-rotatably connected to the flywheel and machine respectively, and disposed between a pair of actuating members or pressure plates which are adapted to shift the brake and clutch elements selectively into engagement with a common plate or reaction member secured for rotation with the shaft and against axial movement therealong, the pressure plates being both urged in one direction by a common and adjustable biasing means, and one of the pressure plates being shiftable by fluid motor means positioned about the shaft and about the adjustable biasing means, the arrangement resulting in a particularly effective and smoothly acting unit which permits the use of relatively large diameter brake and clutch elements.

As another object, this invention aims to provide an air or other fluid pressure actuated clutch and brake mechanism for selectively rotating and stopping a shaft having a fluid pressure conducting passage therein, the novel structure and arrangement of the parts of the mechanism affording particular ease in assembly, adjustment and replacement of parts, the mechanism including a hub adapted to be keyed to the shaft to be rotated and having a connecting passage adapted to place the fluid pressure conducting passage of the shaft in communication with a fluid pressure motor or actuator, and clutch and brake members selectively shiftable under the influence of the actuator and spring biasing means into and out of engagement with a common member fixed for rotation with the hub, the actuator or fluid motor being positioned adjustably along splines on said hub and maintained in fluid tight engagement therewith by sealing means requiring a minimum of fitted parts and including sealing rings such as O-rings or the like, and wherein the actuator includes an annular piston in axial alignment with the clutch and brake members.

Additionally the invention provides impact means for manually rotating the clutch and brake mechanism together with the supporting shaft of a press or the like past dead center position in the event the press comes to rest in that position but cannot be started therefrom, the impact rotating means including spaced projections presented by the clutch mechanism towards the flywheel and engageable by a retractible projection movable with the flywheel, a spanner wrench or lever for rotating the flywheel manually and independently of the clutch mechanism to bring the movable projection forcibly against the projections presented by the clutch mechanism, the impact or jarring resulting from the inertia of the flywheel causing rotation of the clutch and brake assembly and the shaft of the press or the like away from its dead center position.

Figure 2:
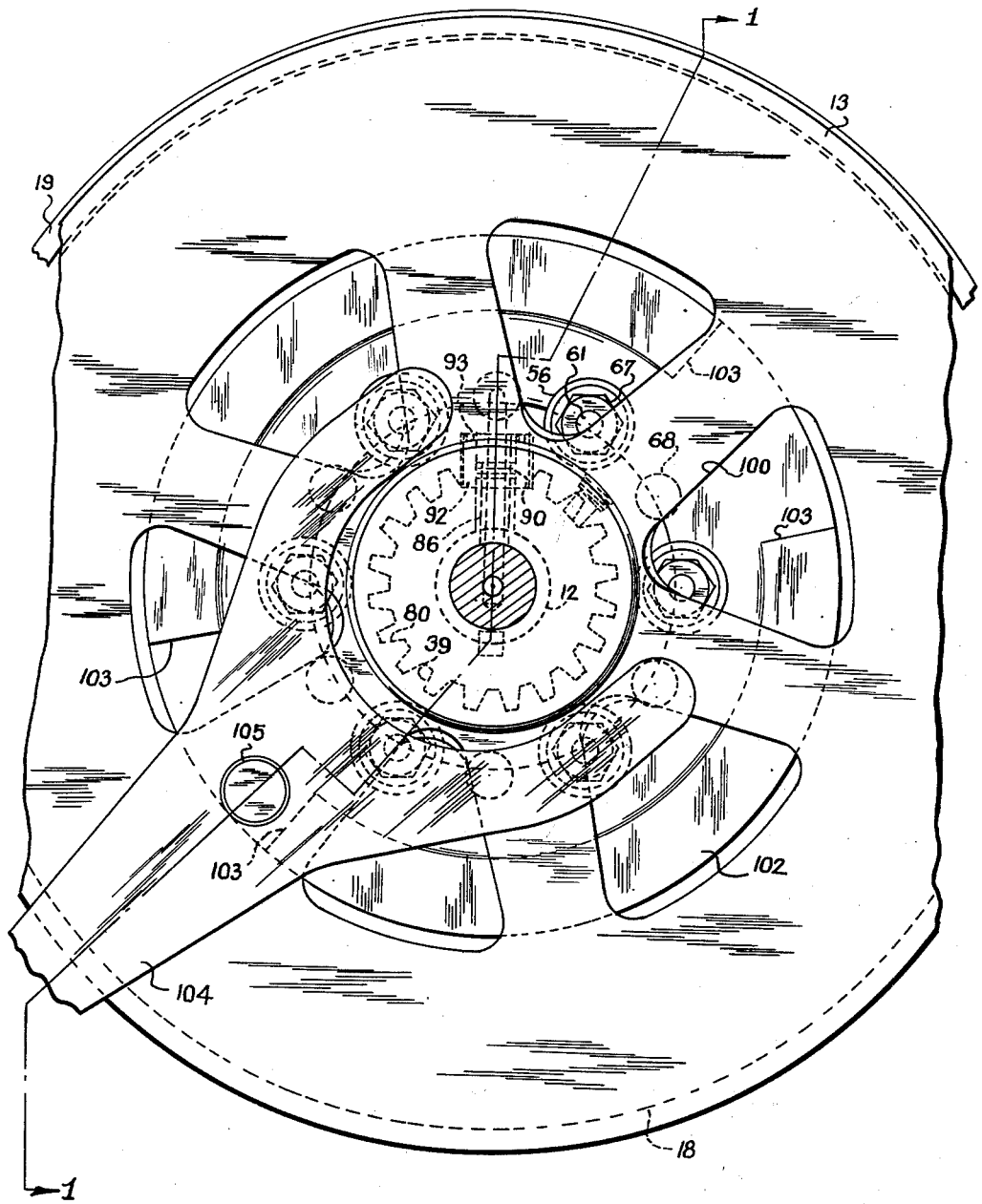

The above objects and advantages, and others, will appear from the following detailed description of a preferred embodiment of the invention taken in conjunction with the accompanying drawings forming a part of this specification and in which:

FIG. 1 is a sectional view of a clutch and brake mechanism embodying the invention and showing a portion of the wrench in position, the view being taken along a line generally coincident with the axis of rotation of the device, and FIG. 2 is an end view of the clutch and brake mechanism of FIG. 1 substantially along the line 2—2 of FIG. 1 with some portions omitted.

The illustrated assembly embodying this invention is shown as having a combination clutch and brake structure indicated generally at 10, together with a stationary or frame portion 11 of a press or the like, having an overhanging rotary shaft 12 supporting a flywheel 13. The shaft 12 is suitably journalled in the frame of the press 11 so that the overhang, or portion of the shaft extending beyond the frame, may support the flywheel 13 and the interposed clutch and brake structure 10. The latter is advantageously made to be compact and has a narrow profile to permit a short shaft overhang and a consequent reduction in bearing requirements for journalling the shaft 12.

The flywheel 13 is mounted or supported on the shaft 12, in a manner permitting rotation with respect thereto, by suitable bearings 14 and 15 which are maintained in position by retaining nuts 16 and 17, respectively, and their associated lock washers. In this instance the flywheel 13 is in the form of a sheave and has grooves 18 about its periphery to receive power transmission or drive belts 19. The flywheel 13 is formed with a rim 20 and has secured thereto, as by screws 21, a ring 22 presenting a series of axially aligned splines 23 about its inner surface.

A plurality of clutch rings or elements 24 and 25, having castellations or teeth 26 about their outer peripheries, are carried within the ring 22 with their teeth 26 in sliding engagement with the splines 23. The clutch rings or elements 24 and 25 are thereby mounted for rotation with the flywheel 13, but are free to be moved axially of the assembly along the splines 23. The clutch elements 24 and 25 may be made from any suitable material capable of withstanding heat and friction as developed in clutches of this general character.

A ring 30, similar to the ring 22, is secured as by screws 31 to a stationary portion of the press 11 and has spaced about its inner surface a series of axially extending splines 32. A brake ring or element 33, having castellations or teeth 34 about its outer periphery, is mounted within the ring 30 with the teeth 34 in sliding engagement with the splines 32. So mounted, the brake element 33 is held stationary with respect to rotation of the shaft 12, but is free to be moved or shifted axially thereof.

The rotary shaft 12 is provided with a hub 35 which is secured for rotation therewith by a key 36, the hub being conveniently held axially between the bearing 14 and a shoulder 37 on the shaft. The hub 35 has a series of axially extending splines 39 about its circumference for purposes which will be presently explained.

A friction element in the form of a plate or disk 40, having a central opening defined by a series of teeth 41, is fixed for rotation with the shaft 12 through co-operation of the teeth 41 with the splines 39 about the hub 35. The friction element 40 is in abutting relation with a circular keeper or retaining clip 43, and is maintained in that relation by a spanner nut 44 screwed onto a threaded portion 45 of the hub 35. A set screw 46 and a soft metal plug 47 serve to lock the spanner nut 44 in position. The fixed or common friction plate 40 is disposed between the axially movable clutch ring 24 and the movable brake ring 33, and is engageable selectively thereby and serves as a reaction member when the brake is made effective to halt the rotation of the shaft 12, or when the clutch is energized or made effective to rotate the shaft.

Between the clutch rings or members 24 and 25 there is included an axially movable friction member 48 which has a central opening defined by spaced teeth 49 in sliding co-operation with the splines 39 of the hub 35. The disk or friction member 48 is thereby constrained to rotation with the shaft 12, but is free to shift into frictional engagement with, or be clamped between, the clutch elements 24 and 25 and so tend to rotate the shaft 12 with the flywheel 13.

Two spaced, actuating or pressure plates 52 and 53 are provided to force or urge the clutch and brake rings into active engagement with the common reaction member or fixed plate 40. The clutch pressure plate 52 is provided with teeth 54 in sliding co-operation with the splines 39 of the hub 35, and thus is constrained to rotation with the shaft while being axially shiftable therealong, and is adapted to engage the clutch ring 25.

A resilient biasing means is provided to urge the clutch actuating or pressure plate 52 away from the clutch ring 25, and includes a compression spring 55 extending through an opening in the friction plate or element 48 and having one end seated on or abutting the fixed plate 40, its other end being received or seated in a composite cup-shaped member 56. The latter extends through an opening 57 in the clutch pressure plate 52 and has a lip or flange 58 engaging that plate whereby the biasing spring 55 is effective to urge the plate in a direction away from clamping engagement with the clutch rings 24 and 25.

The brake actuating or pressure plate 53 has a central opening 60 which clears the retaining nut 44, and is aligned and supported in part by a stud or pin 61 which is threadedly secured to the plate 53 as at 62, with a locking or set screw 63 preventing the pin 61 from becoming unscrewed during adjustment and operation of the assembly as will be relateed hereafter. The pin 61 extends through, and is slidably received in, an opening 64 in the fixed friction plate or reaction member 40, and further extends through the spring 55 and the cup member 56, terminating in a threaded end portion 65.

An adjusting nut 67 is threadedly received by the end portion 65 of the pin 61, and bears against the end of the cup member 56. By advancing the nut 67 along the threaded end 65, the force exerted by the spring 55, tending to shift the pin 61 and hence also the brake pressure plate 53, may be adjusted or varied.

A plurality of the above described biasing arrangements may be provided at spaced intervals in a circular pattern about the shaft 12 as is best illustrated in FIG. 2. As an additional means of aligning the brake pressure plate, a series of pins 68 are secured or fixed in the common plate 40 and included in the circular pattern, the pins 68 being received in guide holes 69 in the plate 53. The pins 68 are, in this instance, split at one end as at 70 and are each provided with a plug 71 having a tapered thread, the plug acting as a wedge to spread the split end of the pin fixing it securely in the plate 40. Any number of biasing springs 55 and guide pins 68 may be included in the pattern as necessary, the positions of six of each being illustrated in FIG. 2.

It will be observed that the spring biasing means are located radially inwardly of the clutch and brake rings, thereby allowing the rings to have the largest possible diameter for a clutch and brake assembly of a given outside diameter.

The brake and clutch functions are controlled or actuated through the use of a fluid pressure motor means which includes a disk-like cylinder member 75 having an annular groove 76 therein opening toward the clutch pressure plate 52 and in axial alignment with all of the clutch and brake members. The groove 76 serves as a cylinder for an annular piston 77 disposed therein and provided with suitable packing or sealing rings 78 and 79.

The cylinder member 75 has a central opening provided with a series of teeth 80 in engagement with the splines 39 of the hub 35 and a spanner nut 81, and its associated set screw 82, adjustably positions and restrains the disk-like cylinder member 75 of the fluid pressure motor or actuator means against axial movement when the clutch is energized.

The shaft 12 has a fluid pressure conducting or supply passage 83 defined therein which, through sealing means presently described, is in communication with a passage 84 in the cylinder member 75 providing communication with the annular groove or cylinder 76.

A tubular element 86 is threaded at 87 into the shaft 12 and in communication with the passage 83 therein. The element 86 extends radially through an opening 88 in the hub 35 and is provided with a sealing ring or O-ring 90 in a grooved shoulder thereabout. The splines 39 of the hub 35 are relieved about the opening 88 to receive a cylindrical sealing member 92 which is adapted to be disposed around the tubular element 86 and in sealing engagement with the O-ring 90 thereof.

The cylindrical sealing member 92 is itself provided with an O-ring 93 preferably in a groove about the marginal end thereof. The cylinder member 75 is relieved to form a way or slot having a surface 94 adapted to be engaged in sealing relation by the O-ring 93 of the cylindrical sealing member 92. In assembling the cylinder member 75 on the hub 35, no press fits or large O-rings are required, the only fitting being in the length of the cylindrical sealing member 92. The above arrangement maintains a fluid tight relation between the cylinder member 75 and the shaft 12 without compromise in simplicity and convenience of assembly. Also, clutch and brake assemblies of different diameters can be readily assembled all using the same hub, thereby avoiding the necessity of special hubs for each size of clutch and brake assembly.

A rotary fluid pressure seal 95 is threadedly secured to the shaft 12 at 96, and serves to connect the passage 83 to a source of compressed air or other pressurized fluid through a conduit 97 and under the control of suitable operating valves.

The biasing spring adjusting nuts 67 may be reached with an adjusting wrench through access openings 100 provided in the flywheel 13. The openings 100 serve also as ventilating ports permitting air circulation to aid in the dissipation of heat.

It will be observed that upon energization of the fluid pressure motor means the annular piston 77 will move in its cylinder or groove 76, shifting the clutch pressure plate 52 against the influence of the springs 55, and tending to clamp the clutch rings 24 and 25, with the shaft mounted friction element 48 therebetween, against the fixed or common friction plate 40. The resultant compression of the springs 55, through the agency of the cup-shaped members 56 relieves the brake actuating pressure plate 53 from any biasing effect by the springs 55 acting through the nuts 67 and the pins 61. When in such condition the clutch is engaged and the brake is disengaged or ineffective, and the drive shaft 12 is caused to rotate with the flywheel 13. Because the annular piston 77 is in axial alignment with the clutch rings or members 24 and 25, and with the reaction member or common friction plate 40, the engagement or pick-up of the clutch will be effected by directly applied pressure, assuring smooth, sure and chatter free operation.

Upon release of fluid pressure from acting on the piston 77 the biasing springs 55 will be effective to shift the clutch and brake pressure plates 52 and 53 to bring the clutch pressure plate 52 to a position releasing the clutch rings 24 and 25 from their clamped condition, allowing the rotary motion of the drive shaft 12 to become independent of the flywheel rotation. The shifting of the brake pressure plate 53 serves to clamp the brake ring 33 against the common or fixed friction plate 40, halting or preventing the shaft 12 from rotation.

The number of clutch and brake rings to be used in the practice of this invention may be varied in accordance with the load or power the assembly is to be subjected to, for example the clutch ring 25 and friction element 48 may be deleted without altering the mode of operation or function of the device.

Means are provided for manually rotating the shaft 12 in the event the associated press or the like stops on dead center and may not be started therefrom by normal starting procedures. To this end the cylinder member 75 is provided with an interrupted rim 102 forming axially projecting lugs having end faces 103. A wrench or spanner 104 is provided with a pin 105 which is adapted to extend through an opening 106 in the flywheel 13 and between adjacent end faces 103 of the interrupted rim 102.

With screws 31 withdrawn, the clutch disengaged, and the brake engaged, the flywheel may be rotated by applying force to the wrench 104, bringing the pin 105 forcibly into contact with one of the end faces 103 of the rim 102. The inertia of the flywheel will result in a blow or impact of the pin 105 against the end face 103 sufficient to jar the entire assembly 10 into rotation. Repeated impacts or jarring will enable the shaft 12 to be rotated sufficiently beyond dead center to start the press or the like by usual methods.

From the foregoing detailed description it will be appreciated that there has been provided by this invention a combination clutch and brake assembly which attains the previously stated objects and advantages as well as others, and that the invention further provides a clutch and brake mechanism which is rugged and simple of construction while being particularly adaptable and versatile. It will be readily apparent also that the invention provides these features in a quick acting and more reliable construction than has been possible heretofore.

Although this invention has been described in considerable detail and with respect to an illustrated assembly embodying the invention, it is understood that the invention is not limited thereto but rather it includes those changes and modifications as are embraced by the scope of the attached claims.

Having described my invention, I claim:

1. In a clutch and brake mechanism including a shaft, a drive means for rotating said shaft, clutch means for connecting said shaft and said drive means, and brake means for stopping said shaft: a hub secured to said shaft for rotation therewith, a stationary plate fixed to said hub and disposed between said clutch and brake means for selective frictional engagement thereby, fluid pressure means for actuating said clutch means mounted on said hub for rotation therewith and including a cylinder member having an annular axially facing groove in alignment with said clutch and brake means and an annular piston received therein, means for axially adjusting the position of said cylinder member on said hub, a first fluid pressure conducting passage in said shaft, a second fluid pressure conducting passage in said cylinder member in connection with said groove, a radial opening in said hub, a first tubular member in connection with said first fluid pressure conducting passage extending through said radial opening, a second tubular member in connection with said said second fluid pressure conducting passage surrounding said first tubular member and extending between said hub and said cylinder member, said first and second tubular members providing communication between said first fluid passage in said shaft and said second fluid passage in said cylinder member, a first O-ring between the one end of said second tubular member adjacent said cylinder member and said cylinder member, and a second O-ring between said first tubular member and said second tubular member, whereby said cylinder member can be positioned with respect to said hub while maintaining a sealing engagement therebetween.

2. In a clutch and brake mechanism including a shaft, a drive means for rotating said shaft, clutch means for connecting said shaft and said drive means, and brake means for stopping said shaft: a hub secured to said shaft for rotation therewith, a stationary plate fixed to said hub and disposed between said clutch and brake means for selective frictional engagement thereby, retaining means for removably and fixedly securing said stationary plate to said shaft, first and second spaced pressure plates disposed with said brake and clutch elements therebetween, biasing means arranged to normally urge said first pressure plate to shift said brake means into engagement with said stationary plate, fluid pressure means for actuating said clutch means mounted on said hub for rotation therewith and including a cylinder member having an annular axially facing groove in alignment with said clutch and brake means and an annular piston received therein, means for axially adjusting the position of said cylinder member on said hub, a first fluid pressure conducting passage in said shaft, a second fluid pressure conducting passage in said cylinder member in connection with said groove, a radial opening in said hub, a first tubular member in connection with said first fluid pressure conducting passage extending through said radial opening, a second tubular member in connection with said second fluid pressure conducting passage surrounding said first tubular member and extending between said hub and said cylinder member, said first and second tubular members providing communication between said first fluid passage in said shaft and said second fluid passage in said cylinder member, a first O-ring between the one end of said second tubular member adjacent said cylinder member and said cylinder member, and a second O-ring between said first tubular member and said second tubular member, whereby said cylinder member can be positioned with respect to said hub while maintaining a sealing engagement therebetween.

3. In a clutch and brake mechanism including a shaft, a drive means for rotating said shaft, clutch means for connecting said shaft and said drive means, and brake means for stopping said shaft: a hub secured to said shaft for rotation therewith, an axially stationary plate fixed to said hub and common to said clutch and brake means, fluid pressure means for actuating said clutch means, said fluid pressure means being mounted on said hub for rotation therewith and including a cylinder member having an axial opening facing said plate in alignment with said clutch means, a piston received in said opening, means for axially adjusting the position of said cylinder member on said hub, a first fluid pressure conducting passage in said shaft, a second fluid pressure conducting passage in said cylinder member in connection with said opening in said cylinder, a radial opening in said hub, a first tubular member in connection with said first fluid pressure conducting passage and extending through said radial opening in said hub, a second tubular member in connection with said second fluid pressure conducting passage and encircling said first tubular member in fluid tight contact therewith, said second tubular member extending between said hub and said cylinder member, said first and second tubular members providing communication between said first fluid passage in said shaft and said second fluid passage in said cylinder member, and fluid tight packing between said cylinder member and the end of said second tubular member adjacent said cylinder member whereby said cylinder member can be positioned with respect to said hub while a sealing engagement is maintained therebetween.

4. In a clutch and brake mechanism for use with a shaft having a hub keyed thereto and a concentrically mounted rotatable drive element, a clutch element slidable axially of said hub and mounted for rotation with said drive element, a brake element mounted for non-rotation but shiftable axially of said hub, a first plate keyed on said hub for rotation therewith and disposed between said clutch and brake elements, mounting means for removably and fixedly securing said first plate to said hub and including a retaining member detachably fixed to said hub and engaging one side of said first plate and a nut member threadedly secured on said hub and movable axially thereof engaging the side of said first plate opposite said one side, said clutch and brake elements being selectively shiftable axially towards and from said first plate, second and third pressure plates slidable axially of said hub and keyed to said hub for rotation therewith and disposed with said brake and clutch elements therebetween, biasing means arranged to normally urge said second pressure plate towards said first plate, and fluid actuated means to move said third pressure plate against the influence of said biasing means toward said first plate to clamp said clutch element in engagement with said first plate.

References Cited in the file of this patent

UNITED STATES PATENTS

| 2,193,068 | Keck | Mar. 12, 1940 |
| 2,213,111 | Strout | Aug. 27, 1940 |
| 2,418,019 | Fast | Mar. 25, 1947 |
| 2,436,968 | Longfield | Mar. 2, 1948 |
| 2,584,190 | Danly et al. | Feb. 5, 1952 |
| 2,862,589 | Porteous et al. | Dec. 2, 1958 |
| 2,909,255 | Chung | Oct. 20, 1959 |
| 2,966,245 | Judge | Dec. 27, 1960 |
| 2,998,872 | Sommer et al. | Sept. 5, 1961 |